Aug. 28, 1928.  
E. T. NEUBAUER  
1,682,088  
ROTARY VALVE FOR INTERNAL COMBUSTION ENGINES  
Filed March 19, 1927
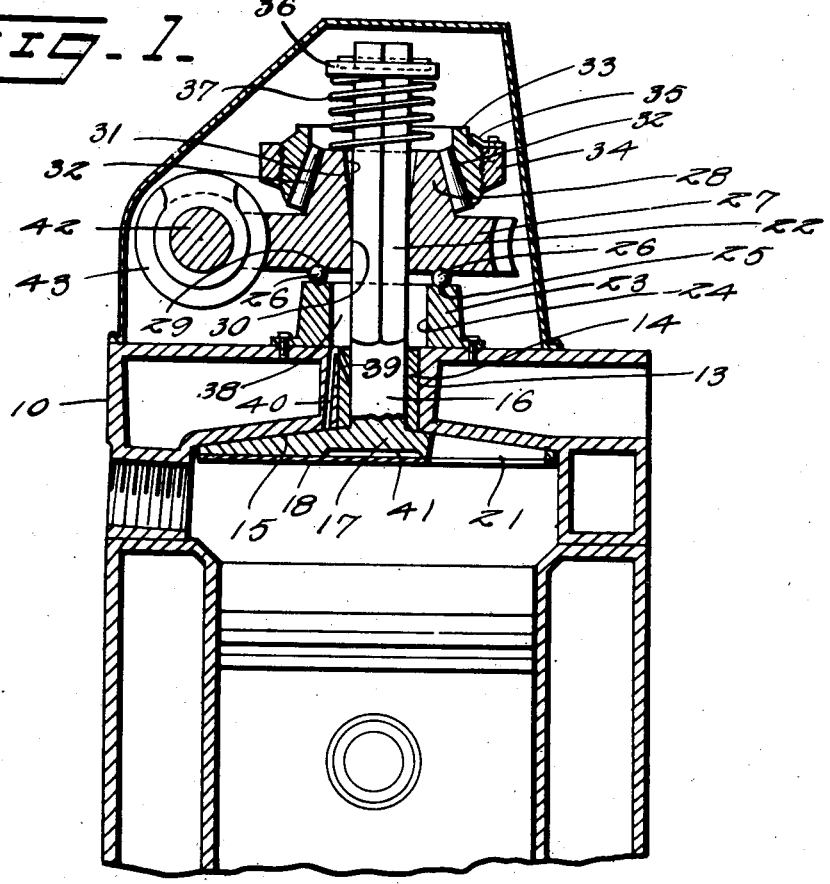
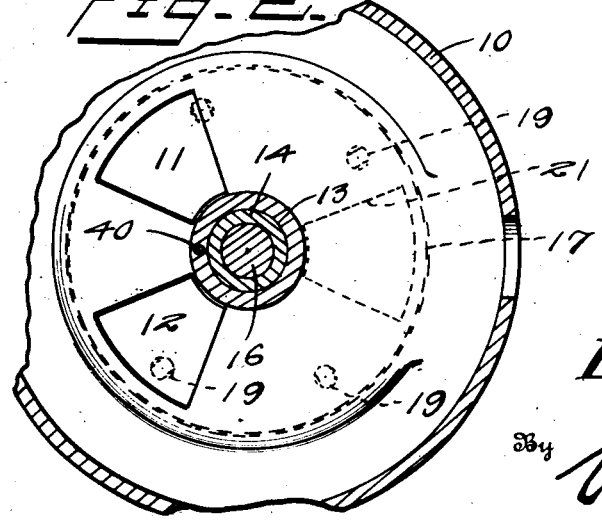
Inventor  
E. T. Neubauer  
By Watson E. Coleman  
Attorney Patented Aug. 28, 1928.

1,682,088

UNITED STATES PATENT OFFICE.

EMIL T. NEUBAUER, OF PORT HURON, MICHIGAN.

ROTARY VALVE FOR INTERNAL-COMBUSTION ENGINES.

Application filed March 19, 1927. Serial No. 176,722.

This invention relates to a rotary valve for internal combustion engines and has for an important object thereof the provision of a mounting for the valve, whereby the valve may be readily inserted and removed.

A further object of the invention is the provision of a construction of this character whereby the valve may be held firmly seated at all times by a spring, the seat of which is the only article which must be removed in order to permit the valve to be removed.

A further object of the invention is to provide a novel and improved means for mounting the driving gear of the valve.

A still further object of the invention is to provide in a construction of this character means for protecting the stem of the valve from the heat to which the valve is subjected, so that the stem or valve will not become warped.

These and other objects I attain by the construction shown in the accompanying drawings, wherein for the purpose of illustration is shown a preferred embodiment of my invention and wherein:—

Figure 1 is a vertical sectional view of the rotary valve;

Figure 2 is a horizontal sectional view thereon;

Figure 3 is a fragmentary bottom view of the valve proper;

Figure 4 is a sectional view of the structure shown in Figure 3.

Referring now more particularly to the drawings, the numeral 10 generally designates a removable cylinder head of an internal combustion engine. This head has formed therein intake and exhaust ports 11 and 12 and has likewise formed therein an axial opening 13, bushed, as at 14. The upper surface of the head has a conical bore 15 to which the opening 13 is axial. Rotatably directed through the bushing 14 is the valve stem 16 of a valve 17, the upper surface of which fits the conical bore of the head. The under surface of this valve has applied thereto a plate 18 which is held in position by rivets 19 having a diameter equal to the width of radially elongated slots 20 formed through the valve 17 and through which they extend. The valve 17 and plate 18 have formed therethrough an opening 21 for coaction with the intake and exhaust ports 11 and 12. The plate 18 serves as a side wall for an air pocket or recess hereinafter referred to.

The valve stem 16 projects through the upper surface of the head 10 and from a point immediately adjacent the upper surface of this head to its upper end is squared, as indicated at 22. Secured to the upper surface of the head in surrounding relation to the opening 13 is a tubular boss 23, the bore 24 of which is of greater diameter than the valve stem and the upper surface 25 of which forms a race for balls 26.

Slidable upon the squared portion of the stem 22 is a combined work gear and thrust bearing unit, of which 27 designates the gear and 28 the bearing unit. The lower face of the gear is formed with the second race 29 for the balls 25. The aperture of the gear through which the valve stem extends slidably fits the valve stem at its lower end, as indicated at 30, and at its upper end is slightly enlarged, as indicated at 31, so that it combines with the valve stem to produce thereabout an oil reservoir in which oil may collect to insure proper lubrication of the stem. The thrust bearing element of the unit is frusto-conical in form and has its outer face engaged by rollers 32, the outer faces of which are, in turn, engaged by an adjustable section 33 threaded into a fixed support 34 carried by the head and held in adjusted positions with relation thereto by a lock, generally designated at 35.

The upper end of the valve stem has means for securing thereto a spring seat 36 and between this spring seat and the upper end of the gear, a spring 37 is disposed, which constantly urges the valve stem upwardly. The valve stem 16 is lubricated and cooled by oil which is fed thereto from a reservoir 38 formed by the head 10, the stem 16 and tubular boss 23. Oil may be fed to this reservoir in any suitable manner. From this reservoir, ports 39 and 40 formed in the bushing 14 and the wall of the head 10 conduct lubricant to the valve stem and the upper face of the valve respectively.

To further assist in cooling the valve stem and preventing warping thereof, the under surface of the valve is recessed, as at 41, so that when the plate 18 is attached thereto, a dead air space is formed, insulating that portion of the valve to which the stem is attached. The gear 27 can be driven in any suitable manner. In the present instance, a shaft 42 is disclosed, which may be connected with the crank shaft of the engine to be driven therefrom at the proper speed and which has a worm 43 coacting with the gear. It will be obvious that the valve will at all times be held seated by the spring 37 and as it rotates, will tend to more firmly seat itself. Any wear upon the bearings will be taken up by the adjustable bearing section 33 which, since it forces the combination unit downwardly, will remove wear from either the upper or lower thrust bearing, as desired. The air space 41 serves as means for preventing the heat from the interior of the cylinder penetrating the intermediate portion of the valve and prevents the valve stem from absorbing the heat.

Since the construction hereinbefore set forth is capable of a certain range of change and modification without materially departing from the spirit of the invention, I do not limit myself to such specific structure except as hereinafter claimed.

I claim:—

1. A rotary valve for internal combustion engines having a stem extending from one wall thereof, said wall being adapted to confront and bear against a wall of the engine cylinder, the opposite face of the valve having a plate applied thereto and means connecting the plate and valve permitting relative movement thereof due to differences in expansion.

2. A rotary valve for internal combustion engines having a stem extending from one wall thereof, said wall being adapted to confront and bear against a wall of the engine cylinder, the opposite face of the valve having a plate applied thereto and means connecting the plate and valve permitting relative movement thereof due to differences in expansion, the last named face of the valve in alignment with the valve stem being formed with a recess whereby said plate combines therewith to produce a dead air space insulating the valve stem from the remainder of the valve.

In testimony whereof I hereunto affix my signature.

EMIL T. NEUBAUER.